United States Patent

Chinomi et al.

[11] Patent Number: 5,829,727
[45] Date of Patent: Nov. 3, 1998

[54] POWERED SEAT SLIDE DEVICE

[75] Inventors: Isamu Chinomi; Masao Sebata, both of Ayase; Wataru Ishii, Atsugi, all of Japan

[73] Assignee: Ikeda Bussan Co., Ltd., Ayase, Japan

[21] Appl. No.: 660,474

[22] Filed: Jun. 7, 1996

[30] Foreign Application Priority Data

Jun. 9, 1995 [JP] Japan .................................. 7-168356

[51] Int. Cl.$^6$ .................................................. F16M 13/00
[52] U.S. Cl. .......................................... 248/429; 248/430
[58] Field of Search .................................... 248/419, 424, 248/429, 430, 562, 569, 571, 573, 602, 636

[56] References Cited

U.S. PATENT DOCUMENTS

| 40,601 | 11/1863 | Brett | 248/602 |
|---|---|---|---|
| 1,384,576 | 7/1921 | Suhr | 248/602 |
| 5,014,960 | 5/1991 | Kimura | 248/602 |
| 5,150,872 | 9/1992 | Isomura | 248/429 |

FOREIGN PATENT DOCUMENTS 6-53265  7/1994  Japan .

*Primary Examiner*—Leslie A. Braun
*Assistant Examiner*—Gwendolyn W. Baxter
*Attorney, Agent, or Firm*—Foley & Lardner

[57] ABSTRACT

A powered seat slide device comprises upper and lower guide rails slidably fitted to each other, and a rail drive mechanism with a reversible motor and a reduction gear box. The drive mechanism includes a screw-threaded shaft being rotatable about its axis through the motor and the gear box and installed on one of the upper and lower guide rails, and a nut member being installed on another rail and screwed into the screw-threaded shaft for a relative axial motion of said screw-threaded shaft with respect to said nut member. An elastic shock-absorbing damper assembly (including essentially annular elastomeric damper) is supported on the screw-threaded shaft in front and in rear of the nut member. The damper assembly includes at least a plastic washer interposed between the nut member and the damper. The plastic washer has a radially and inwardly tapered and circumferentially curved face to define a substantially frusto-conical hollow facing to the flat side wall of the damper, and thus provide an elastic-deformation permissible space of the damper.

10 Claims, 6 Drawing Sheets

POWERED SEAT SLIDE DEVICE

BACKGROUND OF THE INVENTION

1. Field of the Invention

The present invention relates to a powered seat slide device suitable for use in automotive vehicles, and more specifically to a powered seat slide device employing a lower stationary guide rail rigidly mounted on the floor panel of the vehicle body, an upper guide rail slidably fitted to the lower guide rail and firmly secured to the bottom of the automobile seat, and a slide-rail driving mechanism which mechanism is equipped with a nut member usually attached onto the lower guide rail and a motor-driven screw-threaded shaft usually attached to the upper guide rail through a reduction gear box and in screwed-engagement with the nut member for relative motion to the latter.

2. Description of the Prior Art

In recent years, there have been proposed and developed various types of automobile seat assemblies employing a motor-powered seat slide device between the seat cushion and the floor of the vehicle. To provide an optimal driving position of the driver or to provide an optimal position of the vehicle occupant on the seat, the fore-and-aft adjustment of the seat cushion and the angular adjustment of the seat back are made. Depending on a figure or shape of the vehicle occupant, the fore-and-aft adjustment can be properly and easily achieved by way of a powered seat slide device. Referring now to FIGS. 6 to 9, and particularly to FIGS. 8 and 9, there is shown a typical powered seat slide device. As seen in FIG. 8, the powered seat slide device 1 employs a pair of slide rail units, each consisting of a lower stationary guide rail 2, an upper slidable guide rail 5, and rollers 9a provided in the lower guide rail 2 between the bottom surface of the lower guide rail 2 and the horizontal portion of the upper guide rail 5 for rolling movement therebetween and for sliding movement of the upper guide rail to the lower guide rail. As seen in FIG. 9, the lower guide rail 2, usually made of channel bar, includes a base portion 2a, a pair of side portions 2b, and a pair of engaging portions 3 integrally formed with and inwardly bent from the respective side walls 2b. Each engaging portion 3 is substantially L-shaped and has a horizontally-extending section and a downwardly-extending section. Front and rear ends of the lower guide rail 2 are firmly secured onto the floor panel by means of dog-leg like brackets 4a and 4b. On the other hand, the upper guide rail 5, slidably fitted to the lower guide rail 2, is formed into a substantially inverted-T shape. As seen in FIG. 9, the upper guide rail 5 is often comprised of a pair of longitudinally-extending two opposed members, each having the same cross-section and essentially L-shaped in cross section. The longitudinally-extending member of the upper guide rail 5 includes an upwardly-extending straight flat plate section 5c, a horizontally-extending section 5a, and a side wall section 5b upwardly bent from the outer portion of the horizontally-extending section 5a. The horizontally-extending section 5a and the side wall section 5b of the upper guide rail 5 functions as an engaged portion 7 which is in engagement with the engaging portion 3 of the lower guide rail 2 when the upper and lower guide rails 5 and 2 are assembled to each other. In order to produce the upper guide rail, a pair of essentially L-shaped two opposed members, each consisting of the horizontally-extending section 5a, the side wall section 5b and the upwardly-extending straight flat plate section 5c, are integrally connected to each other by spot-welding, riveting or the like. Often mounted on the upwardly-extending straight flat plate section 5c are a seat-belt anchor, a pivot shaft for a seat lifter, and a base for a reclining mechanism. A series of balls 9b are rotatably interleaved between the engaged portion 7 of the upper guide rail 5 and the engaging portion 3 of the lower guide rail 2, for restricting or suppressing the vertical movement and the lateral movement of the upper guide rail 5 relative to the lower guide rail 2, while permitting the back-and-forth sliding movement of the upper guide rail slidably put on the rollers 9a. As is well known, this type of seat slide device shown in FIG. 9, employing rollers 9a and balls 9b operatively disposed between the upper and lower guide rails 5 and 2, is superior to an older type of seat slide device in which a metal surface of an upper guide rail and a metal surface of a lower guide rail are brought into sliding-contact with each other without any rollers and steel balls during sliding action, because a rolling resistance (rolling friction), which is created between the rollers and the guide rails and between the balls and the guide rails, is considerably less than a sliding resistance (sliding friction), which is created between metal surfaces of upper and lower guide rails. The seat slide device, employing rollers 9a and balls 9b, could provide a more smooth sliding motion of the upper guide rail to the lower guide rail and insure a lower level of noise occurring during operation of the seat slide device. Additionally, since the upper and lower guide rails 5 and 2 are engaged with each other by means of a series of balls 9b, there is less play with respect to the vertical direction as well as the lateral direction of the guide rail unit. In the powered seat slide device, an upper-guide-rail drive mechanism is provided to produce the longitudinal sliding motion of the upper guide rail 5 relative to the lower guide rail 2. As illustrated in FIG. 8, the upper-guide-rail drive mechanism includes a reversible motor 11, a reduction gear box 13, a screw-threaded shaft 15, and a nut member 17. In the left-hand side guide rail unit, the reversible motor 11 and the gear box 13 are integrally connected to each other in the form of a geared motor. The geared motor is conventionally attached to a mounting bracket 21 which bracket is firmly secured to the upwardly-extending straight flat plate section 5c of the left-hand side upper guide rail 5 by way of bolts and nuts, or by caulking with rivets or the like. In the right-hand side guide rail unit, only the reduction gear box 13 is attached to the upwardly-extending straight flat plate section 5c of the right-hand side upper guide rail 5 through the mounting bracket 21. Although it is not clearly shown in FIG. 8, the reduction gear box 13 is usually comprised of a worm and a worm wheel driven by the worm to provide a predetermined reduction gear ratio. In more detail, in the right-hand side gear box 13, the worm is mechanically linked to the output shaft of the motor 11 through a connecting rod 23, and the front end of the right-hand screw-threaded shaft 15 is firmly connected into the central bore of the worm wheel. In the left-hand side gear box 13, the worm is connected directly to the output shaft of the motor 11, and the left-hand screw-threaded shaft 15 is firmly connected into the central bore of the worm wheel. The rear end of each screw-threaded shaft 15 is rotatably supported by way of a rear-shaft-end support bracket which is ordinarily riveted to the straight flat plate section 5c of the upper guide rail. The nut member 17 is fixedly connected to the lower guide rail 2 or rigidly mounted on the floor panel. With the previously-noted arrangement, during operation of the motor 11, the right and left screw-threaded shafts 15 are rotatable in synchronization with each other. FIG. 8 illustrates a maximum backwardly-slid position of the upper guide rail in which the rear end of each gear box 13 is brought into abutment with the front end of the nut member 17. As may be appreciated, in the prior art device as shown in FIGS. 8 and 9, there could result in undesired noise owing to abutment between the gear box 13 and the nut member 17. When the upper guide rail 5 has reached the maximum forwardly-slid position, there may result in noise owing to abutment between the rear end of the nut member 17 and the rear-shaft-end support bracket for the screw-threaded shaft 15. To avoid this, Japanese Utility Model Provisional Publication No. 6-53265, assigned to the same assignee as the present invention, has been disclosed a powered seat slide device with a substantially annular elastomeric damper fitted onto a screw-threaded shaft for ensuring elastic contact between the nut member and the elastomeric damper with elastic deformation of the damper. FIGS. 6, 7A and 7B show the abutment relationship between the gear box 13, the nut member 17 and the substantially annular elastomeric damper 25, in the conventional powered seat slide device as indicated in the Japanese Utility Model Provisional Publication No. 6-53265. When the upper guide rail is positioned in the maximum backwardly-slided position as seen in FIG. 6, the elastomeric damper 25 is sandwiched between a metal plain-washer 27 and a front end surface of the nut member 17. The plain washer 27, supported on the outer periphery of the front end of the screw-threaded shaft 15 in a manner so as to abut the rear end surface of the gear box 13, serves as a stopper or a spacer by means of which the maximum backwardly-slided position is determined. As seen in FIG. 7A, when the damper 25 is brought into elastic-contact with the front end surface of the nut member 17 due to the backward sliding movement of the upper guide rail 5, and then the damper 25 is strongly contracted or compressed in its axial direction, there is a possibility that a part of the inner peripheral section of the rear end 25a of the damper 25 is jammed into a slight aperture defined between the female screw-threaded portion 17a of the nut member 17 and the male screw-threaded portion of the shaft 15 due to screw rotation when a part of the rotating screw-threaded shaft 15 enters the female threaded portion of the nut member. As seen in FIG. 7B, in the event that the plain washer 27 is formed with undesired flashes or burrs by pressing or the like, there is a possibility that the front end 25b of the damper 25 becomes damaged due to burrs or flashes formed on the plain washer 27. During contraction of the elastomeric damper 25, the outside diameter of the damper is diametrically enlarged in lieu of the decrease in thickness. Thus, both side walls of the damper tend to undesiredly wear owing to friction created between the back face of the plain washer 27 and one side wall of the damper 25 and owing to friction created between the fore face of the nut member 17 and the other side wall of the damper. In case that the plain washer 27 is formed with burrs or flashes, there is a possibility of excessive wear at both side walls of the damper. The previously-discussed friction produces noise and heat, thereby resulting in a low durability of the damper.

SUMMARY OF THE INVENTION

Accordingly, it is an object of the invention to provide an improved powered seat slide device which avoids the foregoing disadvantages of the prior art.

It is another object of the invention to provide a powered seat slide device with a long-life elastomeric damper of a superior dampening performance and a high durability, which damper is capable of effectively absorbing or dampening impact force (shock) at both the maximum backwardly-slided position and the maximum forwardly-slid position of the upper guide rail.

It is a further object of the invention to provide powered seat slide device with an elastomeric damper which is effective to reduce noise without any damage to the damper, resulting from elastic deformation of the damper during contraction of the damper.

It is a still further object of the invention to provide an inexpensive powered seat slide device with an elastomeric damper which device can provide a high durability, a superior ability of sliding motion of an upper guide rail to a lower guide rail, and insure less play between the upper and lower guide rails, and additionally effectively dampen impact force (shock) at both the maximum backwardly-slided position and the maximum forwardly-slid position of the upper guide rail.

In order to accomplish the aforementioned and other objects of the invention, a powered seat slide device comprises a lower guide rail rigidly mounted on a floor panel, an upper guide rail slidably fitted to the lower guide rail, a rail drive mechanism for producing a sliding movement of the upper guide rail to the lower guide rail in a longitudinal direction of the upper guide rail, the drive mechanism including (1) a reversible motor, (2) a reduction gear box connected to an output shaft of the reversible motor, (3) a screw-threaded shaft being rotatable about its axis through the reversible motor and the reduction gear box and installed on one of the upper and lower guide rails, and (4) a nut member being installed on another guide rail and screwed into the screw-threaded shaft for a relative axial motion of the screw-threaded shaft with respect to the nut member, and elastic shock-absorbing means provided at each of predetermined maximum forwardly-displaced and backwardly-displaced relative-positions of the nut member with respect to the screw-threaded shaft for absorbing shock by elastically abutting with the nut member substantially at the predetermined maximum forwardly-displaced and backwardly-displaced relative-positions, wherein the shock-absorbing means includes an elastomeric damper and a plastic washer, both supported on the screw-threaded shaft, the plastic washer being interposed between the elastomeric damper and the nut member. The elastomeric damper is essentially annular in shape, and the one side wall of the elastomeric damper has a flat side wall surface, and the plastic washer has a radially and inwardly tapered and circumferentially curved face to define a substantially frusto-conical hollow facing to the one flat side wall of said elastomeric damper. The shock-absorbing means may include an elastomeric damper and a pair of plastic washers, all supported on the screw-threaded shaft, the pair of plastic washers being provided in front and in rear of the elastomeric damper so that the elastomeric damper is sandwiched by the pair of plastic washers. Each of the plastic washers has a radially and inwardly tapered and circumferentially curved face to define a substantially frusto-conical hollow facing to an associated one flat side wall of the elastomeric damper. The substantially frusto-conical hollow defined by the radially and inwardly tapered and circumferentially curved face of each plastic washer is coaxial with respect to the axis of the screw-threaded shaft for permitting elastic deformation of the elastomeric damper and for preventing the elastomeric damper from being diametrically enlarged during contraction of the elastomeric damper. Alternatively, the shock-absorbing means may include a stopper, an elastomeric damper and a plastic washer, all supported on the screw-threaded shaft in that order, the plastic washer being interposed between the elastomeric damper and the nut member so that the plastic washer abuts on one side wall of the elastomeric damper, the one side wall facing the nut member, and the stopper being provided so that the stopper abuts on another side wall of the elastomeric damper. The elastomeric damper is essentially annular in shape, and the two side walls of the elastomeric damper are flat, and the plastic washer has a radially and inwardly tapered and circumferentially curved face to define a substantially frusto-conical hollow facing to one flat side wall of the elastomeric damper whereas the stopper also has a radially and inwardly tapered and circumferentially curved face to define a substantially frusto-conical hollow facing to another flat side wall of the elastomeric damper. The radially and inwardly tapered and circumferentially curved faces of the plastic washer and the stopper oppose to each other. The substantially frusto-conical hollow defined by each of the radially and inwardly tapered and circumferentially curved faces is coaxial with respect to the axis of the screw-threaded shaft, for the purpose of permitting elastic deformation of the elastomeric damper during contraction of the elastomeric damper and of preventing the elastomeric damper from being diametrically enlarged. Instead of the radially and inwardly tapered and circumferentially curved face, an annular recessed portion may be formed on the side wall of the plastic washer so as to provide the same function as the frusto-conical hollow curved face.

According to another aspect of the invention, a powered seat slide device comprises a lower guide rail rigidly mounted on a floor panel, an upper guide rail slidably fitted to the lower guide rail, rollers and balls rotatably disposed between the upper and lower guide rails for sliding movement of the upper guide rail to the lower guide rail through rolling motion of the rollers and balls, a rail drive mechanism for producing a sliding movement of the upper guide rail to the lower guide rail in a longitudinal direction of the upper guide rail, the drive mechanism including (1) a reversible motor, (2) a reduction gear box connected to an output shaft of the reversible motor, (3) a screw-threaded shaft being rotatable about its axis through the reversible motor and the reduction gear box and installed on one of the upper and lower guide rails, and (4) a nut member being installed on another guide rail and screwed into the screw-threaded shaft for a relative axial motion of the screw-threaded shaft with respect to the nut member, and elastic shock-absorbing means provided at each of predetermined maximum forwardly-displaced and backwardly-displaced relative-positions of the nut member with respect to the screw-threaded member for absorbing shock by elastically abutting with the nut member substantially at the predetermined maximum forwardly-displaced and backwardly-displaced relative-positions, wherein the shock-absorbing means includes an elastomeric damper and a plastic washer, both supported on the screw-threaded shaft, the plastic washer being interposed between the elastomeric damper and the nut member, and wherein the elastomeric damper is essentially annular in shape and each side wall of the elastomeric damper is flat, and the plastic washer has a radially and inwardly tapered and circumferentially curved face to define a substantially frusto-conical hollow facing to an associated one flat side wall of the elastomeric damper.

DESCRIPTION OF THE PREFERRED EMBODIMENTS

Figure 8:
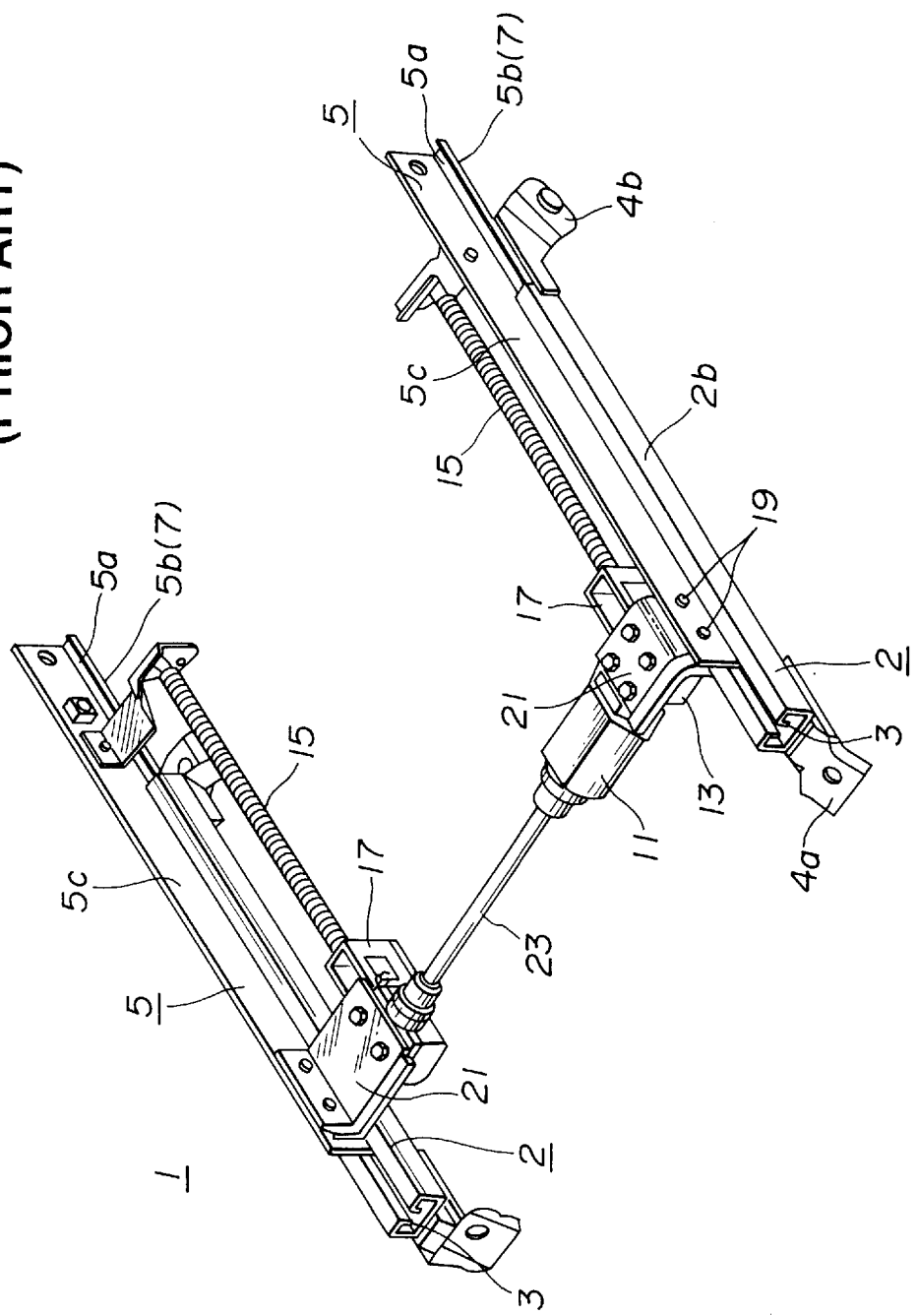
FIG. 8 is a perspective view illustrating a typical structure of a prior art powered seat slide device.

Referring now to the drawings, particularly to FIGS. 1 to 3 and 5, there is shown one embodiment of an elastomeric damper assembly (or an elastic shock-absorbing damper assembly) employed in a powered seat slide device of the present invention. As may be appreciated from FIG. 5, the basic construction of the powered seat slide device of the embodiment is similar to that of the prior art powered seat slide device as discussed previously, and therefore the same reference numerals used in the embodiment will be applied to the corresponding elements used in the prior art device of FIGS. 8 and 9, for the purpose of comparison between the improved device of the embodiment and the prior art device. As will be hereinafter detailed, the powered seat slide device of the embodiment is different from the prior art device in that a structure of an elastomeric damper assembly employed in the device of the embodiment can provide a high durability of the damper and insure a more effective dampening or shock-absorbing performance of the damper, as compared with the older model of elastomeric damper employed in the prior art device.

Figure 1:
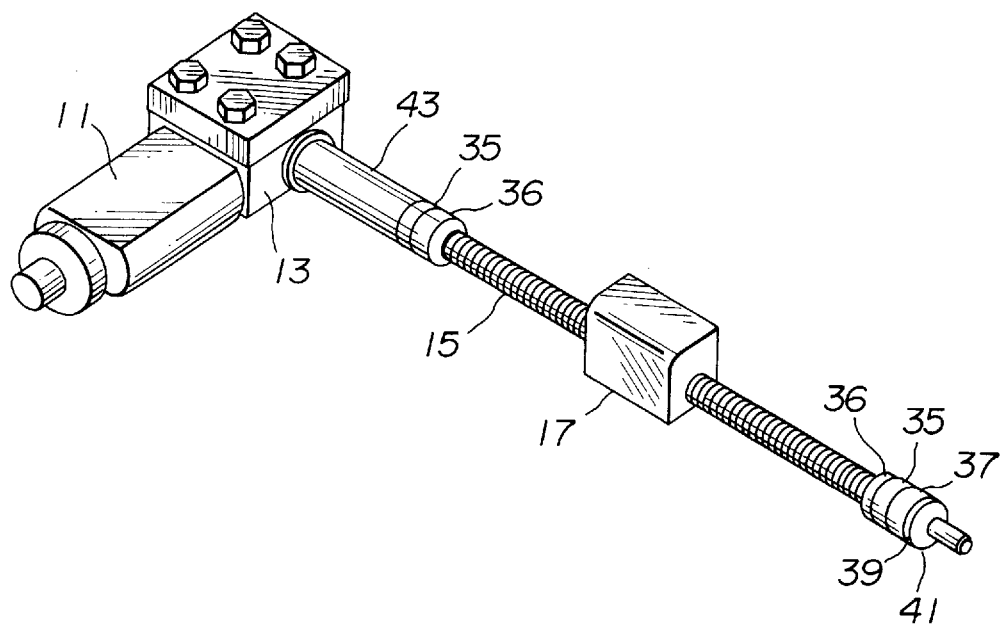
FIG. 1 is a perspective view illustrating an essential portion of a powered seat slide device with an elastomeric damper, made according to the invention.
Figure 2:
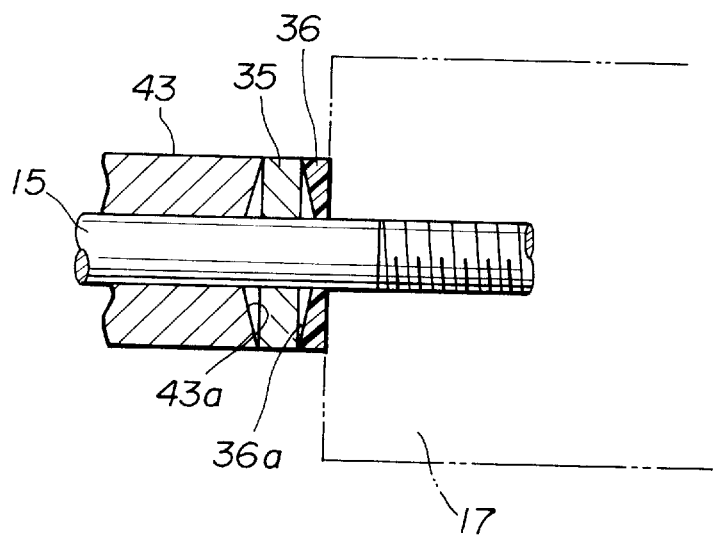
FIG. 2 is a side view illustrating a state in which the upper guide rail has been moved to its maximum backwardly-slided position and thus an elastomeric damper assembly, located forward of a nut member, abuts the front end of the nut member, partly sectioned.
Figure 5:
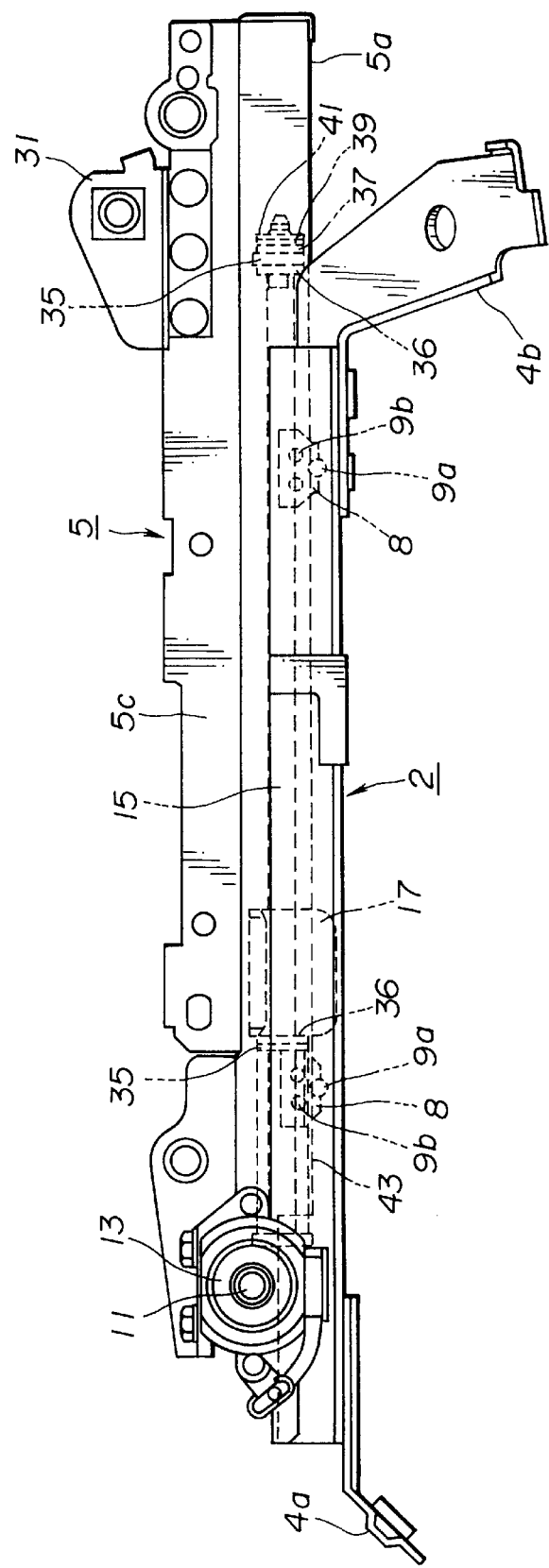
FIG. 5 is a side view illustrating the powered seat slide device having elastomeric dampers, made according to the invention.
Figure 6:
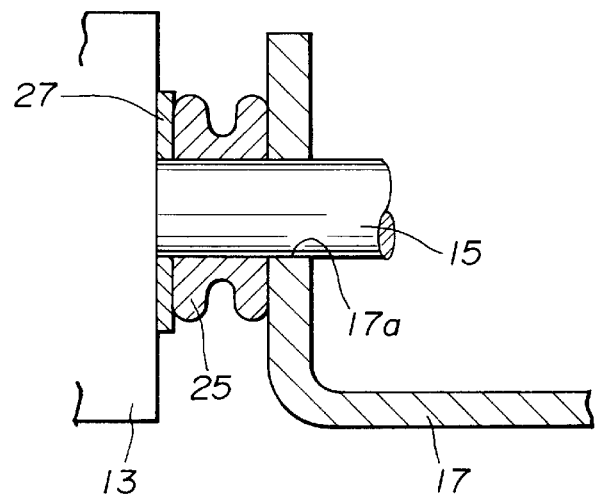
FIG. 6 is a side view explaining a structure of an elastomeric damper employed in a prior art powered seat slide device.
Figure 7A:
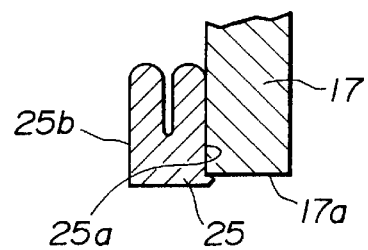
FIG. 7A is a partial cross-sectional view illustrating a state of abutment between the damper and the nut member during contraction of the damper in a state wherein the upper guide rail held at the maximum backwardly-slided position, related to FIG. 6.
Figure 7B:
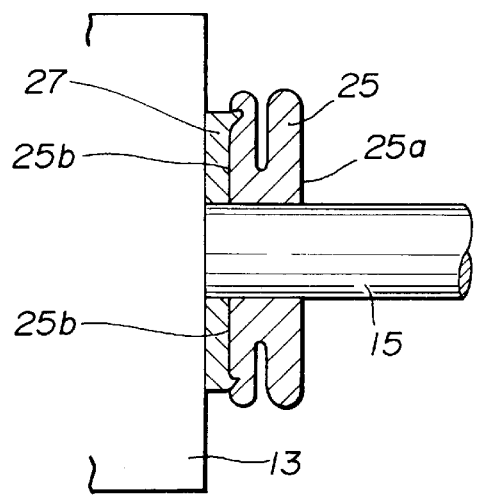
FIG. 7B is a side view explaining an abutted state in which the elastomeric damper is strongly pressed onto the plain washer interposed between the gear box and the damper.
Figure 9:
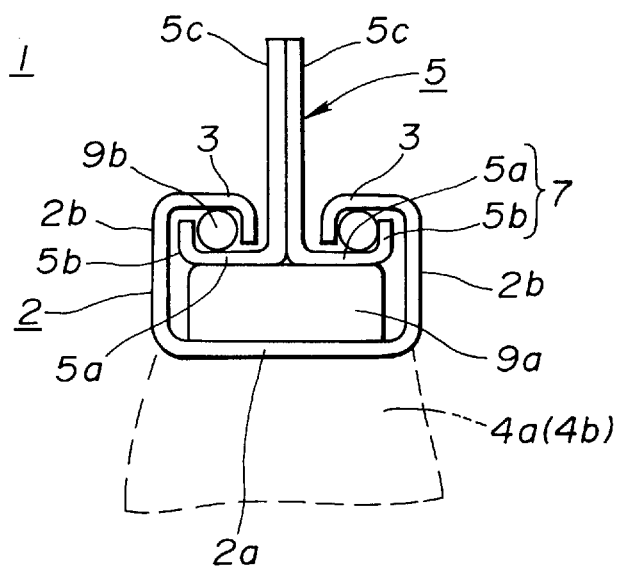
FIG. 9 is a lateral cross-sectional view illustrating a guide rail unit employed in the prior art powered seat slide device of FIG. 8.

As seen in FIG. 5, the powered seat slide device of the embodiment includes the upper slidable guide rail 5 equipped with a seat-belt anchor, a pivot shaft for a seat lifter, a base for a reclining mechanism and the like, and a lower stationary guide rail 2 fixed onto the floor panel through a pair of dog-leg like brackets 4a and 4b. A guide plate or a carriage plate 8 is interposed between the upper and lower guide rails 5 and 2 for operatively and rotatably supporting rollers 9a and balls 9b. The upper guide rail 5 is slidably engaged with the lower guide rail 2 by way of the engaging portion 3 included in the lower guide rail 2, the engaged portion 7 included in the upper guide rail 5, and the balls 9b, while putting its horizontally-extending bottom surface on the rollers 9a. In the shown embodiment, each guide rail unit, consisting of the upper and lower guide rails 5 and 2 slidably assembled to each other with the rollers 9a and balls 9b, has the same rail structure (in cross section) as indicated in FIG. 9. That is, the engaged portion 7 (the bent portion) of the upper guide rail 5 is accommodated inside of the engaging portion 3 (the bent portion) of the lower guide rail 2. Alternatively, an engaged portion of an upper guide rail may be accommodated outside of an engaging portion of a lower guide rail, as if the lower guide rail 2 having the cross section as indicated in FIG. 9 is used as the upper guide rail. One such different rail structure has been disclosed in U.S. Pat. No. 5,150,872, issued Sep. 29, 1992 to Tohru Isomura, the teachings of which are hereby incorporated by reference. In a conventional manner, the upper guide rail 5 is longitudinally slidable with respect to the lower stationary guide rail 2, by means of the upper-guide-rail drive mechanism, comprised of the reversible motor 11, the reduction gear box 13, the screw-threaded shaft 15 and the nut member 17. That is, since the screw-threaded shaft is rotatably supported on the upper guide rail, while the nut member is fixed onto the lower guide rail or on the floor panel, the rotation of the screw-threaded shaft produces a relative axial motion of the screw-threaded shaft to the nut member, and consequently produces a longitudinal sliding motion of the upper guide rail to the lower guide rail. As best seen in FIG. 1, a pair of elastomeric damper assemblies, each including at least an elastomeric damper 35 and a plastic washer 36 made of synthetic resin. In FIG. 1, the elastomeric damper assembly located forward of the nut member 17 and disposed on the screw-threaded shaft 15 between the gear box 13 and the nut member 17 will be hereinafter referred to as a "first elastomeric damper assembly", while the elastomeric damper assembly located backward of the nut member 17 and disposed on the screw-threaded shaft 15 in the vicinity of the free end (the rear end) of the shaft 15 will be hereinafter referred to as a "second elastomeric damper assembly". As can be appreciated from FIG. 2, the first elastomeric damper assembly is so designed that the plastic washer 36 begins to abut the front end of the nut member 17 just before a predetermined maximum backwardly-slided position of the upper guide rail 5 (or a predetermined maximum forwardly-displaced relative-position of the nut member 17 with respect to the screw-threaded shaft 15). As seen in FIG. 2, the first elastomeric damper assembly is comprised of the essentially annular elastomeric damper 35 which damper has an inside diameter nearly equal to the outside diameter of the screw-threaded shaft 15 and has a pair of essentially annular flat side walls, the plastic washer 36 which washer is substantially ring-shaped and supported on the shaft 15 in such a manner as to abut one flat side wall (the back face) of the damper 35, and an essentially cylindrical hollow stopper 43 which stopper is supported on the shaft 15 in such a manner as to abut the other flat side wall (the fore face) of the damper 35. The flat side wall of the damper 35 is perpendicular to the axis of the shaft 15. As appreciated, the damper 35, the washer 36 and the stopper 43 are arranged coaxially with respect to the central axis of the shaft 15. As clearly seen in FIG. 2, the stopper 43 is formed with a radially and inwardly tapered and circumferentially curved frusto-conical hollow 43a (facing the fore face of the damper 35) at its rear-end face. Similarly to the stopper 43, the plastic washer 36 is formed with a radially and inwardly tapered and circumferentially curved frusto-conical hollow 36a (facing the back face of the damper 35) at its front-end face. In case of the first elastomeric damper assembly, the damper 35 is provided on the screw-threaded shaft 15 and sandwiched between the frusto-conical hollow curved face 43a of the stopper 43 and the frusto-conical hollow curved face 36a of the plastic washer 36. Thus, just before the upper guide rail 5 reaches the maximum backwardly-slided position owing to the rearward sliding movement of the upper guide rail 5, the back face of the plastic washer 36 begins to abut the fore face of the nut member 17. At this time, the plastic washer 36, interposed between the damper 35 and the nut member 17, serves to prevent a part of the inner peripheral section of the damper 35 from being jammed into a slight aperture defined between the female screw-threaded portion of the nut member 17 and the male screw-threaded portion of the shaft 15. At the beginning of the abutment of the plastic washer 36 with the fore face of the nut member 17, the outer peripheral edge (having an acute angle in cross section) of each of the frusto-conical hollow curved faces 36a and 43a begins to abut the outer periphery of the damper 35. The abutment of the respective frusto-conical hollow curved face 36a and 43a with the damper 35 tends to gradually develop toward the inner peripheral edge (having an obtuse angle in cross section) of each frusto-conical hollow curved face. This initial contraction of the outer periphery of the damper 35 is effective to prevent the damper 35 from being diametrically enlarged during contraction (elastic deformation) of the damper 35, and whereby the diametrical deformation of the damper 35 is reduced to a minimum. Furthermore, a first internal space is defined among the frusto-conical hollow curved face 43a of the stopper 43, the outer peripheral surface of the shaft 15 and the fore face of the damper 35, whereas a second internal space is defined among the frusto-conical hollow curved face 36a of the washer 36, the outer peripheral surface of the shaft 15 and the back face of the damper 35. The first and second internal spaces are cooperative with each other to permit elastic deformation of the damper 35 into the first and second internal spaces, while preventing the damper being diametrically enlarged, because the respective internal spaces are narrowed radially and outwardly, in other words the respective internal spaces are widened radially and inwardly. Actually, the internal space defined between the two opposing frusto-conical hollow curved faces tends to be gradually decreased, owing to the development of elastic deformation of the damper 35 from the beginning of the abutment of the washer 36 with the nut member 17 to the end of the abutment (until the maximum backwardly-slided position of the upper guide rail has been reached). Even when the outer peripheral edge of the left-hand frusto-conical hollow curved face 43a is in close proximity to the outer peripheral edge of the right-hand frusto-conical hollow curved face 36a, the two opposing frusto-conical hollow curved faces 43a and 36a can provide an internal space enough to permit elastic deformation of the damper 35 during contraction of the damper. As set forth above, since the damper 35 can be elastically deformed between the two opposing frusto-conical hollow curved faces 43a and 36a, minimizing the diametrical deformation of the damper, shock occurring due to the abutment between the first elastomeric damper assembly and the front end surface (fore face) of the nut member 17 can be effectively dampened or absorbed by the elastic deformation of the damper within the internal space defined between the two opposing frusto-conical hollow curved faces 43a and 36a. In other words, the two opposing frusto-conical hollow curved faces 43a and 36a of the stopper 43 and the washer 36 are cooperative with each other to provide an elastic-deformation permissible space therebetween and to reduce a compressibility of the damper 35 (the compressibility is equivalent to a ratio of volume contraction of the damper compressed to a basic volume of the damper uncompressed), and consequently to enhance a durability of the damper 35.

Figure 3:
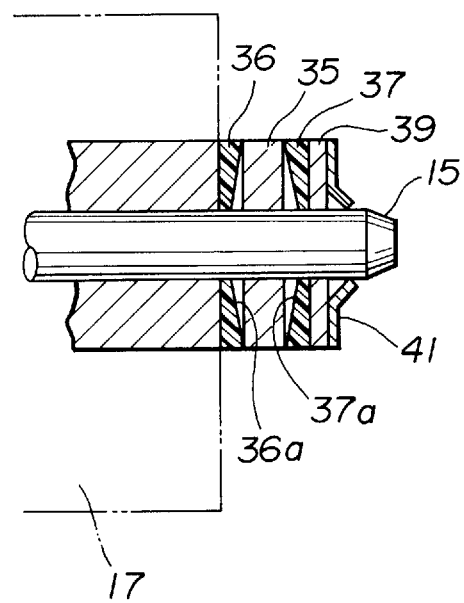
FIG. 3 is a side view illustrating a state in which the upper guide rail has been moved to its maximum forwardly-slided position and thus an elastomeric damper assembly, located backward of the nut member, abuts the rear end of the nut member, partly sectioned.

On the other hand, as may be appreciated from FIG. 3, the second elastomeric damper assembly is so designed that the plastic washer 36 abuts the rear end of the nut member 17 just before a predetermined maximum forwardly-slided position of the upper guide rail 5 (or a predetermined maximum backwardly-displaced relative-position of the nut member 17 with respect to the screw-threaded shaft 15). As detailed in FIG. 3, the second elastomeric damper assembly is comprised of the essentially annular elastomeric damper 35, the plastic washer 36, another plastic washer 37 having the same geometry and dimensions as the washer 36, a metal plain washer 39 and a substantially ring-shaped retainer 41. The retainer 41 serves as a stopper which restricts the rearward movement of the plain washer 39, and thus the second elastomeric damper assembly is firmly retained and put in place on the free end of the screw-threaded shaft 15. As clearly indicated in FIG. 3, the plastic washer 36 is formed with a radially and inwardly tapered and circumferentially curved frusto-conical hollow 36a (facing the fore face of the damper 35) at its rear-end face. Similarly to the washer 36, the plastic washer 37 is formed with a radially and inwardly tapered and circumferentially curved frusto-conical hollow 37a (facing the back face of the damper 35) at its front-end face. In case of the second elastomeric damper assembly, the damper 35 is provided on the screw-threaded shaft 15 and sandwiched between the two opposing frusto-conical hollow curved faces 36a and 37a of the two washers 36 and 37. Thus, just before the upper guide rail 5 reaches the maximum forwardly-slided position owing to the backward sliding movement of the upper guide rail 5, the back face of the plastic washer 36 begins to abut the back face of the nut member 17. At the beginning of the abutment of the plastic washer 36 with the back face of the nut member 17, the outer peripheral edge (having an acute angle in cross section) of each of the frusto-conical hollow curved faces 36a and 37a tends to abut the outer periphery of the damper 35. The abutment of the respective frusto-conical hollow curved face 36a and 37a with the damper 35 tends to gradually develop toward the inner peripheral edge (having an obtuse angle in cross section) of each frusto-conical hollow curved face. This minimizes diametrical deformation of the damper during the contraction (the elastic deformation) of the damper 35. The frusto-conical hollow curved face 36a of the washer 36, the outer peripheral surface of the shaft 15 and the fore face of the damper 35 defines an internal space, whereas the frusto-conical hollow curved face 37a of the washer 37, the outer peripheral surface of the shaft 15 and the back face of the damper 35 defines an internal space, so as to permit elastic deformation of the damper 35 into these internal spaces, while preventing the damper being diametrically enlarged, for the same reasons as the first elastomeric damper assembly. As set out above, since the damper 35 can be elastically deformed between the two opposing frusto-conical hollow curved faces 36a and 37a, minimizing the diametrical deformation of the damper, shock occurring due to the abutment between the second elastomeric damper assembly and the rear end surface (back face) of the nut member 17 can be effectively absorbed by the elastic deformation of the damper within the internal space. In the same manner as the first elastomeric damper assembly as previously explained, in the case of the second elastomeric damper assembly, by the aid of the two opposing frusto-conical hollow curved faces 36a and 37a, a compressibility of the damper 35 can be effectively reduced and as a consequence a durability of the damper 35 can be enhanced. Additionally, there is less friction between the respective frusto-conical hollow curved face (36a, 37a, 43a) and the associated side wall of the damper 35, and thus noise can be reduced to minimum during the contraction of the damper 35.

Figure 4:
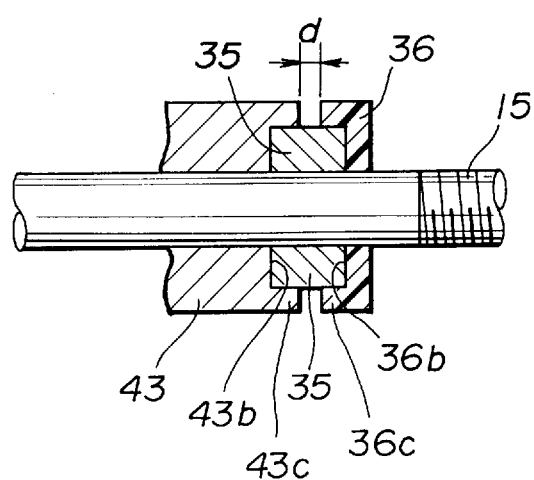
FIG. 4 is a side view illustrating a modification of an elastomeric damper assembly, located forward of the nut member, partly sectioned.

Referring now to FIG. 4, there is shown a modification of an elastomeric damper assembly. The damper structure of the modification is different from that of the previously-noted embodiment in that the plastic washer 36 is formed with an annular recessed portion 36b in place of the frusto-conical hollow curved face 36a, whereas the stopper 43 is formed with an annular recessed portion 43b in place of the frusto-conical hollow curved face 43a. The annular recessed portions 36b and 43b are coaxially aligned with each other with respect to the central axis of the shaft 15 so as to provide the previously-noted elastic-deformation permissible space and to define respective axially extending cylindrical outer flanged portions 43c and 36c on the opposing faces of the stopper 43 and the washer 36. The two opposing outer flanged portions 43c and 36c, defined by the recessed portions 36b and 43b, are in axially spaced relationship with each other by a predetermined distance d under an uncompressed or undeformed state of the washer 35. The distance permits elastic deformation of the damper 35 in the axial direction of the damper, while the two opposing flanged portions 43c and 36c function to restrict or suppress diametrical deformation of the damper 35. Thus, the damper 35 tends to be elastically deformed within the internal space defined between the two recessed portions 36b and 43b, and whereby undesired shock occurring due to abutment between the elastomeric damper assembly and the nut member 17 can be effectively absorbed. During the dampening action (the contraction) of the damper 35, noise can be effectively reduced because of less friction between each of the annular recessed portions 36b and 43b and the damper 35. Therefore, the damper assembly shown in FIG. 4 also provides the same function as the damper assembly shown in FIGS. 2 and 3.

In the previously-described embodiment, in order to produce the relative sliding movement of the upper guide rail to the lower guide rail, the screw-threaded shaft, the reversible motor, and the gear box included in the guide rail drive mechanism are mounted on the upper guide rail side, whereas the nut member is fixed onto the lower guide rail side or onto the floor panel. It will be appreciated that the nut member may be fixedly connected to the upper guide rail, while the screw-threaded shaft, the motor and the gear box may be installed on the floor panel or on the lower guide rail, so as to produce the sliding movement of the upper guide rail relative to the lower guide rail.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:
1. A powered seat slide device, comprising:
   a lower guide rail rigidly mounted on a floor panel;
   an upper guide rail slidably fitted to said lower guide rail;
   a rail drive mechanism for producing a sliding movement of said upper guide rail relative to said lower guide rail in a longitudinal direction of said upper guide rail, said drive mechanism including

(1) a reversible motor, (2) a reduction gear box connected to an output shaft of said reversible motor, (3) a screw-threaded shaft rotatable about its axis through said reversible motor and said reduction gear box and installed on one of said upper and lower guide rails, and (4) a nut member installed on another guide rail and screwed onto said screw-threaded shaft for a relative axial motion of said screw-threaded shaft with respect to said nut member; and elastic shock-absorbing means provided at each of a predetermined maximum forwardly-displaced position and a predetermined maximum backwardly-displaced relative position of said nut member with respect to said screw-threaded shaft, for absorbing shock by elastically abutting said nut member substantially at said predetermined maximum forwardly-displaced and backwardly-displaced positions;

wherein said shock-absorbing means includes an elastomeric damper and a plastic washer, both supported on said screw-threaded shaft, said plastic washer being interposed between said elastomeric damper and said nut member, wherein said elastomeric damper is substantially annular, and each side wall of said elastomeric damper is flat, and said plastic washer has a circumferentially-extending diametrical-deformation suppressive portion on its outer periphery and an elastic-deformation permissible space in its side wall.

2. A powered seat slide device, comprising:

a lower guide rail rigidly mounted on a floor panel;

an upper guide rail slidable fitted on said lower guide rail;

a rail drive mechanism for producing a sliding movement of said upper guide rail relative to said lower guide rail in a longitudinal direction of said upper guide rail, said drive mechanism including (1) a reversible motor, (2) a reduction gear box connected to an output shaft of said reversible motor, (3) a screw-threaded shaft rotatable about its axis through said reversible motor and said reduction gear box and installed on one of said upper and lower guide rails, and (4) a nut member installed on another guide rail and screwed onto said screw-threaded shaft for a relative axial motion of said screw-threaded shaft with respect to said nut member; and elastic shock-absorbing means provided at each of a predetermined maximum forwardly-displaced position and a predetermined maximum backwardly-displaced relative position of said nut member with respect to said screw-threaded shaft, for absorbing shock by elastically abutting said nut member substantially at said predetermined maximum forwardly-displaced and backwardly-displaced positions:

wherein said shock-absorbing means includes an elastomeric damper and a plastic washer, both supported on said screw-threaded shaft, said plastic washer interposed between said elastomeric damper and said nut member, wherein said plastic washer abuts one side wall of said elastomeric damper, said one side wall facing said nut member, wherein said elastomeric damper is substantially annular, and said one side wall of said elastomeric damper has a flat side wall surface, and said plastic washer has a radially and inwardly tapered, and circumferentially curved face which defines a substantially frusto-conical hollow facing the one flat side wall on said elastomeric damper and which defines a circumferentially-extending, outer peripheral edge facing an outer periphery of the one flat side wall of said elastomeric damper.

3. A powered seat slide device, comprising:

a lower guide rail rigidly mounted on a floor panel;

an upper guide rail slidably fitted to said lower guide rail;

a rail drive mechanism for producing a sliding movement of said upper guide rail relative to said lower guide rail in a longitudinal direction of said upper guide rail, said drive mechanism including (1) a reversible motor, (2) a reduction gear box connected to an output shaft of said reversible motor, (3) a screw-threaded shaft rotatable about its axis through said reversible motor and said reduction gear box and installed on one of said upper and lower guide rails, and (4) a nut member installed on another guide rail and screwed onto said screw-threaded shaft for a relative axial motion of said screw-threaded shaft with respect to said nut member; and elastic shock-absorbing means provided at each of a predetermined maximum forwardly-displaced position and a predetermined maximum backwardly-displaced relative position of said nut member with respect to said screw-threaded shaft, for absorbing shock by elastically abutting said nut member substantially at said predetermined maximum forwardly-displaced and backwardly-displaced positions;

wherein said shock-absorbing means includes an elastomeric damper and a pair of plastic washers supported on said screw-threaded shaft, said pair of plastic washers provided at a front and at a rear of said elastomeric damper so that said elastomeric damper is sandwiched by the pair of plastic washers, wherein said elastomeric damper is substantially annular, and formed with two flat side walls, and each of said pair of plastic washers has a radially and inwardly tapered, and circumferentially curved face which defines a substantially frusto-conical hollow facing an associated one flat side wall of said elastomeric damper and which defines a circumferentially-extending outer peripheral edge facing an other periphery of the associated one flat side wall of said elastomeric damper.

4. The powered seat slide device as set forth in claim 3, wherein said flat side walls of said elastomeric damper are perpendicular to an axis of said screw-threaded shaft.

5. The powered seat slide device as set forth in claim 4, wherein said substantially frusto-conical hollow defined by said radially and inwardly tapered and circumferentially curved face of each of said plastic washers is coaxial with respect to said axis of said screw-threaded shaft, for permitting elastic deformation of said elastomeric damper and for preventing said elastomeric damper from being diametrically enlarged during contraction of said elastomeric damper.

6. A powered seat slide device, comprising:

a lower guide rail rigidly mounted on a floor panel;

an upper guide rail slidably fitted to said lower guide rail;

a rail drive mechanism for producing a sliding movement of said upper guide rail relative to said lower guide rail in a longitudinal direction of said upper guide rail, said drive mechanism including (1) a reversible motor,
(2) a reduction gear box connected to an output shaft of said reversible motor,
(3) a screw-threaded shaft rotatable about its axis through said reversible motor and said reduction gear box and installed on one of said upper and lower guide rails, and
(4) a nut member installed on another guide rail, and screwed onto said screw-threaded shaft for a relative axial motion of said screw-threaded shaft with respect to said nut member; and elastic shock-absorbing means provided at each of a predetermined maximum forwardly-displaced position and a predetermined maximum backwardly-displaced relative position of said nut member with respect to said screw-threaded shaft, for absorbing shock by elastically abutting said nut member substantially at said predetermined maximum forwardly-displaced and backwardly-displaced positions;

wherein said shock-absorbing means includes a stopper, an elastomeric damper and a plastic washer supported on said screw-threaded shaft in that order, said plastic washer being interposed between said elastomeric damper and said nut member so that said plastic washer abuts a first side wall of said elastomeric damper, said first side wall facing said nut member, and said stopper being provided so that said stopper abuts a second side wall of said elastomeric damper, wherein said elastomeric damper is substantially annular, and said first and second side walls of said elastomeric damper are flat, and said elastic washer has a radially and inwardly tapered, and circumferentially curved face which defines a substantially frusto-conical hollow facing the first flat side wall of said elastomeric damper and which defines a circumferentially-extending, outer peripheral edge facing an outer periphery of the first flat side wall of said elastomeric damper, and said stopper has a radially and inwardly tapered, and circumferentially curved face which defines a substantially frusto-conical hollow facing the second flat side wall of said elastomeric damper and which defines a circumferentially extending, outer peripheral edge facing an outer periphery of the second flat side wall of said elastomeric damper.

7. The powered seat slide device as set forth in claim 6, wherein said first and second flat side walls of said elastomeric damper are perpendicular to an axis of said screw-threaded shaft.

8. The powered seat slide device as set forth in claim 7, wherein said radially and inwardly tapered, and circumferentially curved faces of said plastic washer and said stopper oppose each other, and said substantially frusto-conical hollow defined by each of said radially and inwardly tapered, and circumferentially curved faces is coaxial with said axis of said screw-threaded shaft for permitting elastic deformation of said elastomeric damper and for preventing said elastomeric damper from being diametrically enlarged during contraction of said elastomeric damper.

9. A power ed seat slide device, comprising:
a lower guide rail rigidly mounted on a floor panel;
an upper guide rail slidably fitted to said lower guide rail;
a rail drive mechanism for producing a sliding movement of said upper guide rail relative to said lower guide rail in a longitudinal direction of said upper guide rail, said drive mechanism including
(1) a reversible motor,
(2) a reduction gear box connected to an output shaft of said reversible motor,
(3) a screw-threaded shaft rotatable about its axis through said reversible motor and said reduction gear box and installed on one of said upper and lower guide rails, and
(4) a nut member installed on another guide rail and screwed onto said screw-threaded shaft for a relative axial motion of said screw-threaded shaft with respect to said nut member; and elastic shock-absorbing means provided at each of a predetermined maximum forwardly-displaced position and a predetermined maximum backwardly-displaced relative position of said nut member with respect to said screw-threaded shaft, for absorbing shock by elastically abutting said nut member substantially at said predetermined maximum forwardly-displaced and backwardly-displaced positions;

wherein said shock-absorbing means includes a stopper, an elastomeric damper and a plastic washer supported on said screw-threaded shaft in that order, said plastic washer being interposed between said elastomeric damper and said nut member so that said plastic washer abuts a first side wall of said elastomeric damper, said first side wall facing said nut member, and said stopper being provided so that said stopper abuts a second side wall of said elastomeric damper, wherein said elastomeric damper is substantially annular, and said first and second side walls of said elastomeric damper are flat and perpendicular to an axis of said screw-threaded shaft, and said plastic washer has an annular recessed portion facing the first flat side wall of said elastomeric damper and said stopper has an annular recessed portion facing the second flat side wall of said elastomeric damper, and said annular recessed portions are coaxially aligned with each other with respect to said axis of said screw-threaded shaft to provide an elastic-deformation permissible space of said elastomeric damper and which defines two opposing axially extending cylindrical outer flanged portions on opposing faces of said stopper and said plastic washer, said two opposing axially extending cylindrical outer flanged portions are in axially spaced relationship with each other by a predetermined distance in an uncompressed state of said elastomeric damper.

10. A powered seat slide device, comprising:
a lower guide rail rigidly mounted on a floor panel;
an upper guide rail slidably fitted to said lower guide rail;
rollers and balls rotatably disposed between said upper and lower guide rails for sliding movement of said upper guide rail relative to said lower guide rail through rolling motion of said rollers and balls;
a rail drive mechanism for producing a sliding movement of said upper guide rail relative to said lower guide rail in a longitudinal direction of said upper guide rail, said drive mechanism including
(1) a reversible motor,
(2) a reduction gear box connected to an output shaft of said reversible motor,
(3) a screw-threaded shaft rotatable about its axis through said reversible motor and said reduction gear box and installed on one of said upper and lower guide rails, and
(4) a nut member installed on another guide rail and screwed onto said screw-threaded shaft for a relative axial motion of said screw-threaded shaft with respect to said nut member; and elastic shock-absorbing means provided at each of a predetermined maximum forwardly-displaced position and a predetermined maximum backwardly-displaced relative position of said nut member with respect to said screw-threaded shaft, for absorbing shock by elastically abutting said nut member substantially at said predetermined maximum forwardly-displaced and backwardly-displaced positions;

wherein said elastomeric damper is substantially annular, and each side wall of said elastomeric damper is flat, and said plastic washer has a radially and inwardly tapered, and circumferentially curved face which defines a substantially frusto-conical hollow facing an associated one flat side wall of said elastomeric damper and which defines a circumferentially-extending, outer peripheral edge facing an outer periphery of the associated one flat side wall of said elastomeric damper.

* * * * *